United States Patent [19]

Polett

[11] Patent Number: 5,192,134
[45] Date of Patent: Mar. 9, 1993

[54] RE-USABLE FLEXIBLE BULK CONTAINERS

[76] Inventor: Walter J. Polett, P.O. Box 55, Mount Holly, N.J. 08060

[21] Appl. No.: 790,488

[22] Filed: Nov. 12, 1991

[51] Int. Cl.$^5$ .................. B65D 30/08; B65D 33/14
[52] U.S. Cl. .................................... 383/24; 383/26; 383/41; 383/80; 383/81; 383/95; 383/105; 383/111
[58] Field of Search .............. 383/24, 111, 105, 41, 383/17, 26, 93, 95, 96, 81, 80, 78

[56] References Cited

U.S. PATENT DOCUMENTS

| | | | |
|---|---|---|---|
| 1,228,652 | 6/1917 | Daugherty | 383/95 |
| 2,437,372 | 3/1948 | Ballard | 383/80 |
| 3,060,987 | 10/1962 | Adams | 383/80 |
| 3,789,897 | 2/1974 | Saito | 383/24 |
| 4,390,051 | 6/1983 | Cuthbertson | 383/80 |
| 4,658,989 | 4/1987 | Bonerb | 383/111 |
| 4,781,472 | 11/1988 | La Fleur et al. | 383/105 |
| 4,874,258 | 10/1989 | Marino | 383/111 |
| 4,930,903 | 6/1990 | Mahoney | 383/26 |
| 4,946,291 | 8/1990 | Schnaars | 383/41 |
| 5,108,195 | 4/1992 | Perron | 383/95 |

FOREIGN PATENT DOCUMENTS 0338181 10/1989 European Pat. Off. .............. 383/24

*Primary Examiner*—Stephen P. Garbe
*Attorney, Agent, or Firm*—Norman E. Lehrer

[57] ABSTRACT

A flexible bulk container for the handling and storage of flowable or powdered bulk materials is provided which includes the combination of a flexible and collapsible bulk bag bottom component having an encircling first side wall, a bottom end with an opening therethrough through which contents are discharged connected about its periphery to a bottom end of said first side wall and an open upper end opposite said bottom end and a flexible and collapsible bulk bag top component having a top end, an opposite open lower end and an encircling second side wall connected about the periphery of the top end which is separably receivable within and generally complementary to the first side wall of the bag bottom component wherein the top and bottom ends and first and second side walls define an interior stoarage space therebetween for flowable granular or powdered bulk material with the second side wall being adapted to be in firm engagement with the first side wall when the storage space is at least partially filled. All the surfaces of the top and bottom bag components are readily cleanable for reuse when the container is empty. The container is also provided with a protective skirt secured to the top bag component which extends about the outer surfaces of the container, lifting straps for handling the container when filled, and a complementary liner which is removably connectable to the container, when desired.

13 Claims, 3 Drawing Sheets

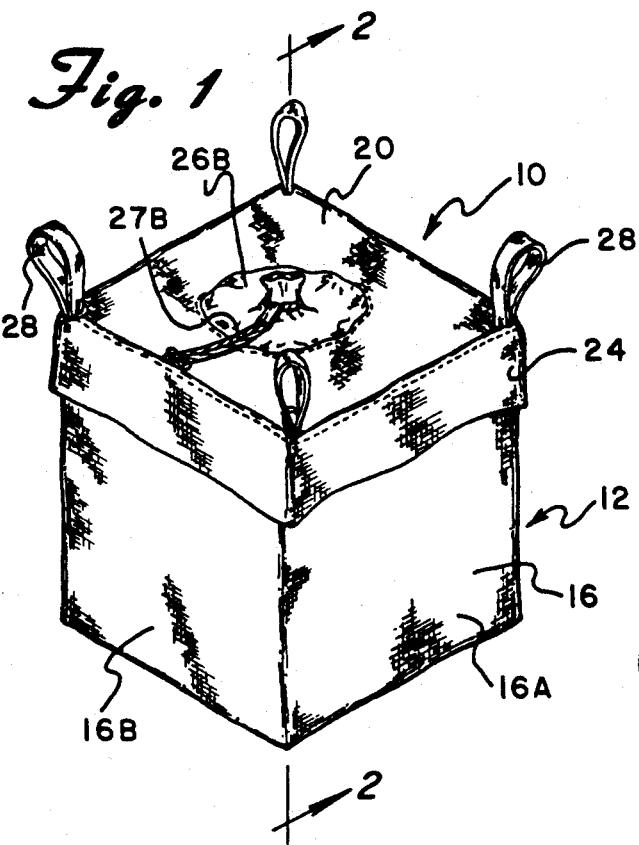
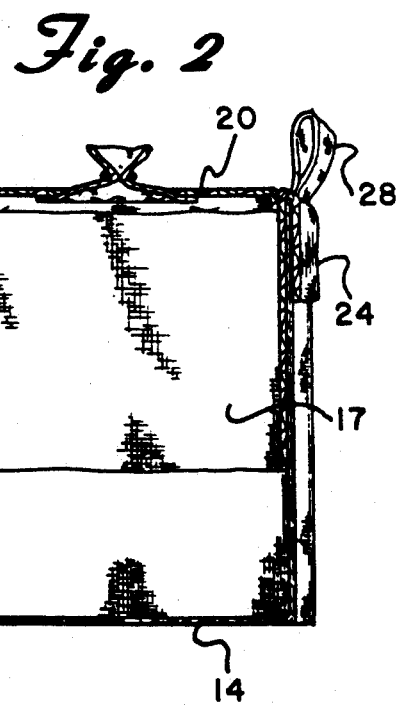
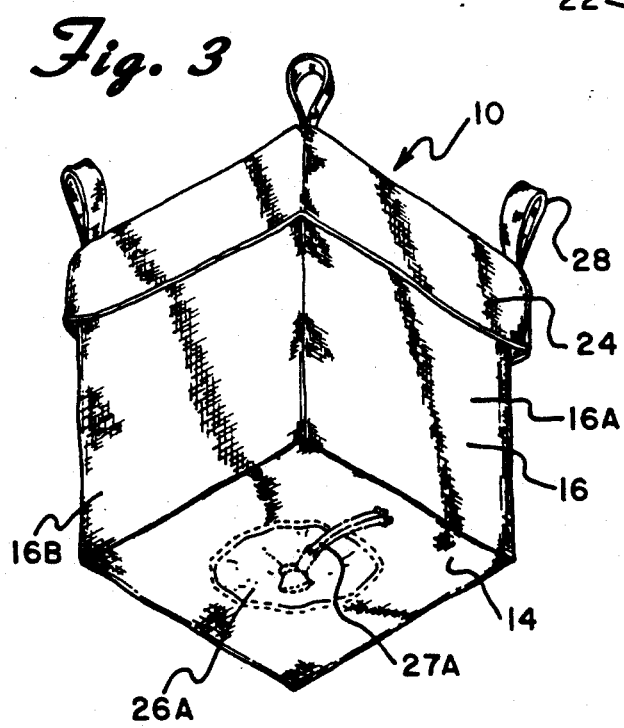

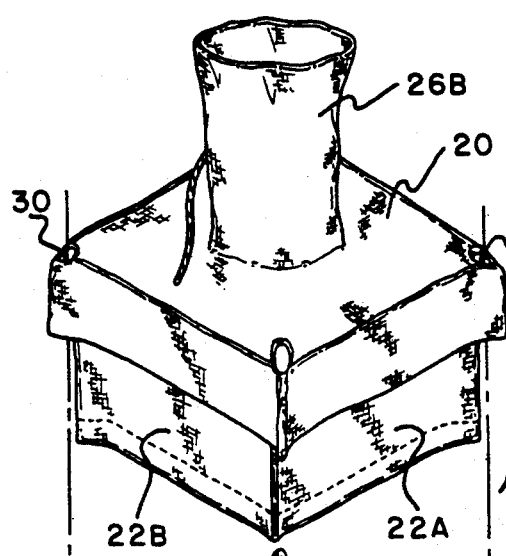
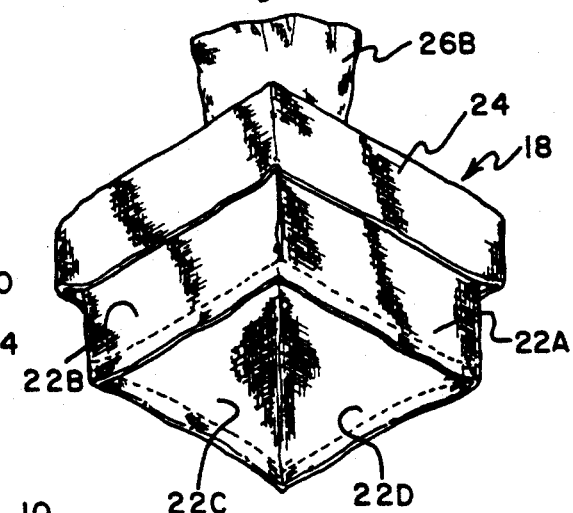
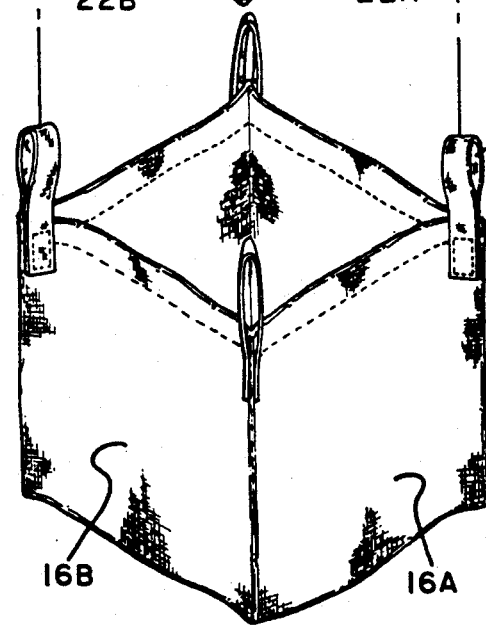
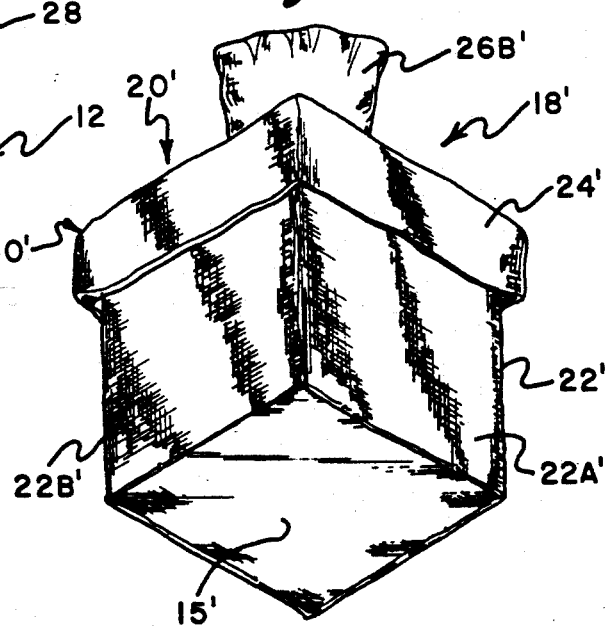

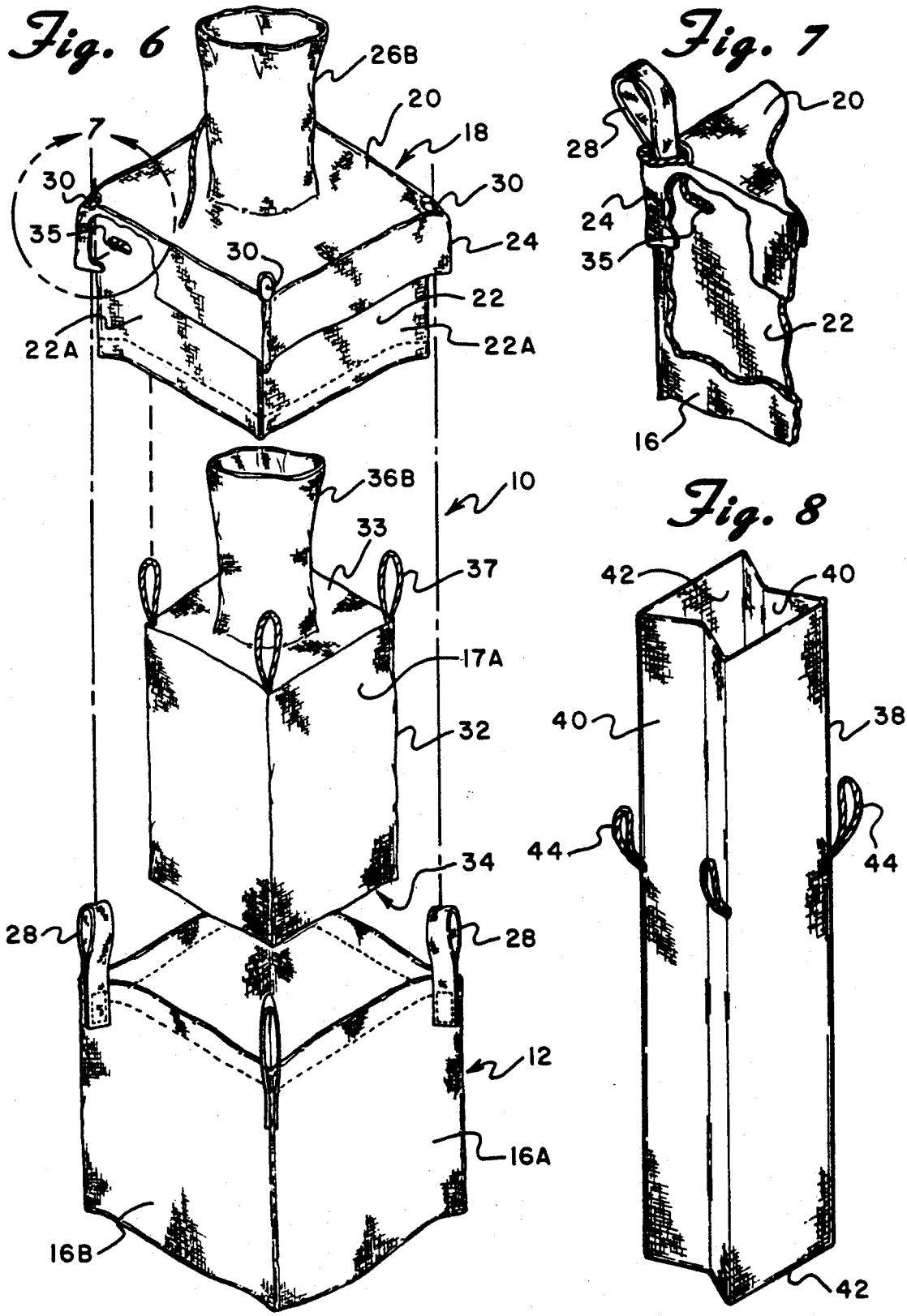

RE-USABLE FLEXIBLE BULK CONTAINERS

FIELD OF THE INVENTION

The present invention relates to flexible bulk containers and, more particularly, to a flexible bulk container in the form of a bag made of a woven fabric of a design which facilitates the cleaning thereof for reuse with materials having strict sterility and hygienic requirements, and to such bags having a liner.

BACKGROUND OF THE INVENTION

Large flexible fabric bags for containing and transporting flowable granular or powdered bulk material such as chemicals, minerals, foodstuff, agricultural products, pharmaceutical and cosmetic ingredients and the like have been used for many years and their use is becoming increasingly more popular. This is due to their relatively low cost and the fact that when the bags are empty, they take up very little space and are relatively light in weight. When filled, the flexible bulk containers may carry a cubic meter or more of material and may weigh in excess of two tons.

The bags used for such purposes have to fulfill several practical requirements. It is of primary importance that the construction of the bag must be such as to sustain heavy loads but, at the same time, the bag must be adapted to be folded or collapsed when empty to a compact and preferably flat form. Frequently, because of the nature and quantity of material shipped in such bags, the bags should also be designed so that they can be easily filled with large quantities of granular and powdered bulk materials and then readily emptied of their contents. It is also desired that such bags be designed so that, when filled, they can be easily handled, and are generally free standing and capable of being stacked vertically one upon another. Furthermore, depending upon the type of material being shipped, some fabric bulk bags may be required to be moisture proof, water resistant and/or hygienic, or requirements may be such that the contents such as food products must be sealed for the purpose of purity, in which case a polyethylene or the like liner is provided.

A variety of bags and bag constructions have been suggested and used as flexible bulk containers such as disclosed, for example, in U.S. Pat. Nos. 3,961,655; 4,113,146; 4,730,942; 4,781,472; 4,822,179; 4,909,410 and European patent publication No. 338,181. Although these bags and containers are common in industry, there are several shortcomings which have been encountered and warrant further attention. For example, while the design, flexibility and light weight of many such bags renders them readily collapsible for convenient return by the user to the shipper for reuse, during the handling and storage of the bags they frequently come in contact with contaminants such as dirt, grease and the like which are deposited on or within the bags. Such contaminants are not only unsightly, but in many cases, the product within the bag is a food product or pharmaceutical ingredient where protection from contamination is essential. Fabric bulk containers in common use cannot be readily cleaned and in such instances, even the use of plastic liners and the like may not provide sufficient hygienic purity, and disposal of the fabric bag is generally necessary. However, if the bag could be readily and thoroughly cleaned prior to reuse, such contamination problems could be essentially eliminated and would be a highly desirable objective in making possible reuse of the bag as well as for protecting the purity of products to be shipped and stored.

In addition, when a polyethylene or the like liner is used in connection with such large fabric bulk bags to contain particulate or granular material whereby the liner is insertable into the exterior fabric bag and the bag is formed with an opening or a spout at one end for discharging the contents, a common problem is the tendency for the particulate contents, when discharged, to draw the liner out of the bag. If the liner is not secured within the bag, the result is often that the liner itself will drop from the bag into the receiving container or bin and this could contaminate the contents which would be undesirable. It is, thus, common practice to secure the liner within the bag, using techniques such as disclosed, for example, in U.S. Pat. Nos. 4,781,472 and 4,946,241. However, due to the size of both the bags and liners, such known means for securing the liner within the bag are generally inconvenient and difficult to use.

Moreover, during the filling of such bags with a product, a great deal of dust can be generated which settles on exposed portions of the bag and liner, and as indicated, during the handling and storage of the bags, they frequently come in contact with contaminants such as dirt, grease, oil and the like against which the contents must be protected. In U.S. Pat. No. 4,909,410 there is suggested a bulk container with a removable protective cover for the outer surfaces of the container in the form of a skirt which is integrally secured to seams of the container. Such protective cover is removed from the bulk container to eliminate contaminants that may have been deposited on the external surface thereof but once removed, the container would have to be reconstructed for replacement of the protective cover and there is no other suggestion therein for cleaning the container itself for possible reuse. Other devices such as removable covers have also been suggested for use with small hand-carried shopping bags and the like to protect the contents thereof against dirt and the elements have also been suggested, for example, in U.S. Pat. Nos. 3,349,992 and 4,930,903. The shopping bags and the like containers employing such protective covers are substantially different in construction and use than the large bulk containers used for shipping and storage of bulk materials and the problems associated therewith are significantly different. Providing large, flexible bulk containers with a device which protects both the container surfaces and the contents thereof from being contaminated during filling, handling and storage would be particularly advantageous.

SUMMARY OF THE INVENTION

It is accordingly an object of the present invention to provide flexible fabric bulk containers which can be readily, conveniently and thoroughly cleaned prior to use so as to present a container suitable for the handling and storage of flowable granular or powdered bulk materials which must maintain absolute purity and freedom from contamination.

It is another object of the present invention to provide flexible fabric bulk containers having lifting means which can be used with or without a liner and can be readily and thoroughly cleaned prior to use or reuse, thus presenting a container with the purity and freedom from contamination required for the handling and storage of food, pharmaceutical and the like products.

It is a further object of the present invention to provide flexible bulk containers having lifting means suitable for use with or without a liner in handling and storage of a variety of granular and powdered bulk materials and which can be reused for such products including those requiring a high degree of purity and freedom from contamination and further, includes a protective cover for such containers suitable to provide substantial protection of the same, when filled, from being contaminated during the handling and storage thereof.

It is a still further object of the present invention to provide a flexible fabric bulk container with lifting means having a lower load-carrying component and a separable upper cover component complementary with the lower load-carrying component for use in handling and storage of a variety of flowable granular and powdered bulk material wherein, when desired, a liner may be readily removably secured therein, the flexible bulk container being conveniently and readily cleanable for reuse with materials which require a high degree of purity and freedom from contamination, such flexible bulk containers including means for providing protection of the contents from contamination during the filling thereof or during the handling and storage of the filled containers.

In accordance with the present invention there is provided a flexible bulk container comprising in combination;
- a flexible and collapsible bulk bag bottom component having a first side wall, a bottom end connected to said first side wall with an opening therethrough through which contents are discharged and are opposite open upper end; and
- a flexible and collapsible bulk bag top component having a top end, an opposite open lower end and a second side wall connected to said top end separably receivable within and generally complementary to the first side wall of said bag bottom component and adapted to be in firm engagement with said first side wall.

In another aspect of the invention there is provided a flexible bulk container having lifting means which comprises in combination:
- a flexible and collapsible bulk bag bottom component having a bottom end with an opening therethrough through which contents are discharged and an encircling first side wall connected at one end to the bottom end about its periphery and with an opposite upper end thereof defining an open end with at least two spaced lifting means secured to the upper open end of said first side wall and projecting upwardly therefrom; and
- a flexible and collapsible bulk bag top component having a top end with spaced openings adjacent its periphery in general alignment with said spaced lifting means and an encircling second side wall connected at one end to said top end about its periphery, said encircling second side wall being separably receivable within and generally complementary to the first side wall of said bag bottom component and adapted to be in firm engagement therewith with the spaced lifting means projecting through said openings in said top end and extending thereabove.

In a still further aspect of the present invention there is provided a flexible bulk container which comprises in combination;
- a flexible and collapsible bulk bag bottom component having a bottom end with an encircling first side wall connected at one end to the bottom end about its periphery with an opposite open end:
- a flexible and collapsible bulk bag top component having a top end, an encircling second side wall connected at one end to said top end about its periphery and a skirt member secured about one end thereof to the periphery of said top end and extending about at least a portion of said second encircling side wall, said bulk bag top component being separately receivable within said bulk bag bottom component with said second encircling side wall generally complementary to said first encircling side wall and adapted to be in firm engagement therewith and said skirt member extending about at least a portion of said first encircling side wall.

Other objects, features and advantages will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a top perspective view of a flexible bulk container constructed in accordance with the principles of the present invention;

FIG. 2 is a cross-sectional view taken on line 2—2 of FIG. 1;

FIG. 3 is a bottom perspective view of the flexible bulk container shown in FIG. 1;

FIG. 4 is an exploded view, in perspective, of the flexible bulk container shown in FIG. 1.

FIG. 5 is a bottom perspective view of the separable top bag component of the flexible bulk container shown in FIG. 1;

FIG. 5A is a bottom perspective view of an alternative separable top bag component of a flexible bulk container constructed in accordance with the principles of the present invention;

FIG. 6 is an exploded view, in perspective, of the flexible bulk container shown in FIG. 1 wherein a plastic liner is used in connection with the bulk container;

FIG. 7 is an enlarged perspective view taken on line 7 of FIG. 6 illustrating the liner connections employed to secure a plastic liner within the top bag component of the flexible bulk container shown in FIG. 6;

FIG. 8 is a tubular plastic liner, in perspective, suitable for use in connection with the flexible bulk container shown in FIG. 1.

DETAILED DESCRIPTION OF THE PREFERRED EMBODIMENT

Referring now to the drawings wherein like reference numerals identify like elements there is shown, in FIGS. 1 to 5, a flexible bulk container or bag constructed in accordance with the principles of the present invention and designated generally as 10. The container 10 is of flexible, collapsible construction and is comprised of the combination of a lower bag portion 12 including a bottom wall 14 and surrounding side walls 16 and an upper bag portion 18 which is separable from the lower bag portion 12 having a top wall 20 with surrounding side walls 22 insertable within and complementary to the side walls 16 of the lower bag portion 12 and a surrounding skirt 24 connected at the upper ends thereof about the periphery of the top wall 20 which overlies a portion of the side walls 16 of the lower bag portion 12. Spaced lifting strap loops 28 are secured to the upper portion of the side walls 16 of the lower bag portion 12, located generally adjacent the corners of the container 10 when assembled, and projecting upwardly therefrom for the purpose of transporting the same, and the bottom wall 14 and top wall 20 have closable spouts 26A and 26B therein for filling or emptying the bag. The container 10, when filled, is generally cubical as shown in FIGS. 1 to 3, and when empty, the lower and upper bag portions 12 and 18 are separable from one another and each portion can be collapsed and folded into a generally flat and compact configuration, or can be conveniently cleaned by washing and the like.

The lower bag portion 12 comprises first surrounding side walls 16 formed of four sides 16A, 16B, 16C and 16D joined at the side edges thereof by stitching or the like. A substantially flat bottom wall 14 is secured about the periphery thereof between the lower ends of sides 16A to 16D by stitching. The bottom wall 14 includes a discharge spout assembly 26A which can be of any conventional construction such as cone-shaped, with full spout, flat shaped with full spout or full-open duffel style and can be closed in any well known manner as by ties 27A. Lifting strap loops 28 are provided for the purpose of lifting and placing the container 10 in position by a forklift truck and the like during transport and handling. Each loop 28 is comprised of a length of webbing or fabric material, the ends of which are secured to the upper portion of a side wall by stitching at points adjacent the corners thereof.

The upper bag portion 18 comprises second surrounding side walls 22 formed by joining four sides 22A, 22B, 22C and 22D at the edges thereof by stitching or the like with the upper ends thereof being folded over to form a skirt 24 thereabout. The upper ends of the side walls 22A to 22D and of the overfolded skirt 24 are secured about the periphery of the substantially flat top wall 20 by stitching. Openings 30 are formed in the top wall 20 adjacent the corners thereof, generally intermediate the side walls 22 and the skirt 24, and are located in general alignment with the spaced lifting strap loops 28 attached to side walls 16 of the lower bag portion 12. A fill spout 26B which can be of any conventional construction is provided centrally in the top wall 20 which could be closed in any known means as by ties 27B.

The construction and arrangement of the upper bag portion 18 is essentially complementary to that of the lower bag portion with which it is combined for use in the flexible bulk container 10 of the invention. The second side walls 22 of the upper bag portion 18 are readily insertable within and complementary to the first side walls 16 of the lower bag portion 12 with the skirt 24 being disposed about the outer periphery of the upper portion of the side walls 16, the top wall 20 generally abutting the upper edges of the side walls 16 and the lifting strap loops 28 projecting through the openings 30 in the top wall 20. The bottom and top walls 14 and 20 and side walls 16 and 22 of the upper and lower bag portions 12 and 18 define, when assembled, an interior storage space 17 therebetween for storage of flowable granular or powdered bulk material in the manner of a typical bulk container. The side walls 22 of the upper bag portion 18 are generally shorter than the side walls 16 of the lower bag portion 12 but are of sufficient length so that when the container 10 is at least partially filled, the side walls 22 are forced into firm engagement with and supported by the side walls 16 of the lower bag 12 without stretching, tearing or damaging the lower bag portion 12. The top wall 20 and skirt 24 provide protection for the interior storage space 17 and at least a portion of the outer surface of the side walls 16 against dust, dirt and other contaminants during filling as well as during handling and storage operations.

As indicated, assembly of the lower bag portion 12 and upper bag portion 18 provides an interior storage space 17 for flowable granular or powdered bulk material in the manner of a typical bulk container and the two bag components 12 and 18 are in firm interengagement when the interior storage space 17 is at least partially filled by virtue of the weight of the granular bulk material also in the manner of a conventional bulk container. The flexible bulk container 10 thus can be used for handling and storage of bulk quantities of material with the cover 20 and integral skirt 24 protecting the interior storage space 17 and upper external sides of the container from contaminants and the lifting strap loops 28 providing the means for handling and transporting such filled flexible bulk container. However, when emptied, the two separable portions 12 and 18 of the flexible bulk container 10 of the invention can be individually folded and stored or, as should be evident, each bag portion 12 and 18 and the interiors thereof can be readily washed or cleaned using conventional methods. The open end of each bag portion enables the interior surfaces thereof, as well as the outer surfaces, to be completely accessible for such purpose.

Lower and upper bag portions 12 and 18 can be constructed of any suitable strong material which is flexible but substantially inextensible. Natural or synthetic woven material can be employed such as jute cotton, polyethylene or polypropylene with woven polypropylene being typically used because of its strength, durability and puncture resistance.

In FIG. 5A is shown an alternate embodiment wherein the upper bag portion 18' comprises second surrounding side walls 22' formed by joining four sides 22A', 22B', 22C' and 22D' at the edges thereof with the upper ends overfolded to form a skirt 24' thereabout, the upper ends of the side walls 22' and skirt 24' being secured about the periphery of the top wall 20'. The side walls 22' are substantially the same length as and complementary to the side walls 16 of the lower bag portion 12. The lower ends of such second side walls 22' are secured about the periphery of a supplemental bottom wall 15' which is suitable to fit within the bottom end and complementary to the bottom wall 14 of the lower bag portion 12 with the top wall 20' and skirt 24' disposed to provide protection against contamination of the interior chamber of the container and upper portions of the side walls 16 of the lower bag portion 12. The supplemental bottom wall 15' may include a discharge spout aligned and coordinated for use with the discharge spout 26A in the bottom wall 14. In such embodiment, the side walls 22' and supplemental bottom wall 15' are supported within the lower bag portion 12 and, if desired, can be made of a thinner and less costly construction which can be disposed of in the event it becomes unduly contaminated. Lifting strap loops 28 secured to the upper ends of side walls 16 project through openings 30' in the top wall 20' and serve, as indicated, for assisting in filling and for handling of the filled flexible bulk container 10'.

In FIGS. 6 to 8 there is illustrated the large flexible bulk container 10 of the invention with a complementary liner 32 receivable within the container 10 and releasably attachable to it in accordance with the present invention by connector loops 37. The flexible upper and lower bag portions 18 and 12 are constructed as hereinabove described and the liner 30 is made of a film or sheet of a flexible generally impervious material, preferably polypropylene or polyethylene.

The construction and arrangement of the liner 32 illustrated in FIG. 6 is essentially complementary to that of the container 10 in which it is received. The liner 32 has side walls 31, a top wall 33 with fill spout 36B and bottom wall 34 which forms a generally cubicle configuration when fully expanded which defines storage space 17A. Connector loops 37 project upwardly from the liner 32 adjacent the upper corners thereof in general alignment with apertures 35 through the upper ends of the side walls 22 of the upper bag portion 18. Liner 32 is of sufficient size so that when the assembled container 10 with liner 32 is filled, the liner is forced into firm engagement with and supported by the sides and bottom of the container 10 without stretching, tearing or damaging the liner. In accordance with the invention, the liner can be first inserted into the lower 12 or, preferably, the upper bag portion 18 when the two bag portions 12 and 18 are being assembled to form the container 10, and the liner 32 is removably connected to the container 10 adjacent the upper end thereof by threading the connector loops 37 projecting therefrom through apertures 35 in the side walls 22 and then mounting the same about the lifting strap loops 28 (see FIG. 7). This can be conveniently accomplished since, as indicated, the bottom end of the upper bag portion 18 is open and readily accessible for receipt of the liner within the upper bag portion 18 by manual manipulation of the liner and bag portion.

As shown, the upper wall 33 of the liner 32 is formed with a fill spout 36B complementary with the fill spout 26B in the upper bag portion 18. The bottom wall 34 of the liner 32 can be formed with a discharge spout 36A complementary to the discharge spout 26A in the lower bag portion 12, can be full-open and gathered duffel style complementary to the discharge spout 26A or can be provided with other conventional discharge means. The complementary liner 32 when inserted within the flexible bulk container 10, provides an interior storage space 17A for flowable granular or powdered bulk material in the manner hereinabove described, the two bag components 12 and 18 being in firm interengagement when the interior storage space 17A is at least partially filled and the lifting strap loops 28 projecting therefrom provide the means for handling and transporting the filled container 10. When emptied, the two portions 12 and 18 of the flexible bulk container 10 and the complementary liner 32 can be readily separated and separably folded and stored or, as should be evident, each bag portion 12 and 18 can be readily cleaned and the liner can be replaced, if desired.

In FIG. 8 is illustrated an alternative embodiment employing a liner 38 made of a film or sheet of a flexible generally impervious material in tubular form with 2 opposite gusseted sides 40, opposite open ends 42 and spaced connector loops 44. Connector loops 44 are secured by conventional means to the sides of the liner 38 intermediate the open ends 42 in general alignment with the apertures 35 through the side walls 22 in the upper bag portions 18. The liner 38 is of a diameter so that when the gusseted sides are fully expanded they will be forced into firm engagement with and supported by the sides of the container without stretching, tearing or damaging the liner 38. The liner can be removably connected within the container 10 by virtue of the connector loops 44 as shown in FIG. 7. In this embodiment, the open ends 42 of the liner 38 can be gathered and tied for operation in conjunction with the fill spout 26B and discharge spout 26A of the container 10, or one or both of the opposite ends 42 can be gathered and supported by the top wall 20 and/or bottom wall 14 of the container 10. As should be evident, the liner 38 in tubular form can be provided as separate components or can be supplied as a continuous tube on a roll wherein lengths thereof can be separated as required by cutting or the like.

From the foregoing it will be apparent that the flexible bulk container of the invention constitute a departure from prior art concepts in flexible bulk containers and the like being designed for convenient and facile cleaning by individuals for reuse, the ready use of complementary liners if needed and provides further protection against contamination by dust, dirt, oil and the like of the interior of the bag as well as the exterior surface thereof. Moreover, the flexible container of the invention can not only be readily used for the handling and storage of materials having strict sterily and hygenic requirements but can be used to avoid premature disposal of the flexible bulk container due to damage or excessive accumulation of dirt.

Having thus described the invention in relation to the drawings hereof, it will be clear that modifications could be made in the preferred embodiment without departing from the spirit of the invention. Accordingly, it is not intended that the words used to describe the invention be limiting thereof nor should the drawings be considered so. It is intended that the invention be limited only by the scope of the appended claims.

What is claimed is:

1. A flexible bulk container for handling and storage of flowable materials comprising in combination:

(a) a flexible and collapsible bulk bag bottom component having an encircling first side wall, a bottom end with an opening therethrough through which the contents are discharged connected to a lower portion of said first side wall and an open upper end opposite said bottom end; and (b) a flexible and collapsible bulk bag top component having a top end, an encircling second side wall connected to said top end which is separably receivable within and generally complementary to the first side wall of said bag bottom component, said top component also having an open lower end opposite said top end, said lower end having an opening substantially equal in size to the outermost perimeter of said top component, said top and bottom ends and first and second side walls defining an interior storage space therebetween for flowable granular or powdered bulk material with the second side wall being adapted to be in firm engagement with said first side wall when said storage space is at least partially filled.

2. The invention according to claim 1 wherein said top and bottom components have inside surfaces in contact with said materials, said upper end of sida bottom component having an opening substantially equal in size to the outermost perimeter of said bulk container, said components constructed such that upon disengagement of said top and bottom components and openings in each allow for visual exposure of substantially entirely all inside surfaces of said components, access to said side walls and ends uninhibited by other side walls and ends.

3. The flexible bulk container as claimed in claim 1, wherein said top end includes an opening therethrough through which said container is filled.

4. The flexible bulk container for handling and storage of flowable materials having lift means which comprises in combination:
   (a) a flexible and collapsible bulk bag bottom component having a bottom end with an opening therethrough through which contents are discharged and an encircling first side wall which is connected at a lower portion to the bottom end about its periphery and has an opposite upper end open with at least two spaced lifting means secured to an upper portion of said first side wall projecting upwardly therefrom; and
   (b) a flexible and collapsible bulk bag top component having a top end with spaced openings adjacent its periphery in general alignment with said spaced lifting means and an encircling second side wall connected at an upper portion to said top end about its periphery, said encircling second side wall being separably receivable within said bag bottom component and generally complementary to the first side wall of said bag bottom component with the spaced lifting means projecting through said openings in said top end and extending thereabove, wherein said top and bottom ends and encircling first and second side walls define an interior storage space therebetween for flowable granular or powdered bulk material with the second side wall being adapted to be in firm engagement with said first side wall when said storage space is at least partially filled.

5. The flexible bulk container as claimed in claim 4, wherein said flexible bag top component includes a skirt member secured at an upper portion thereof about the periphery of said top end and extending about at least a portion of said second encircling side wall, said skirt member being adapted to extend about at least a portion of the encircling first side wall.

6. The flexible bulk container as claimed in claim 4, wherein said container includes a flexible and collapsible liner means receivable within said bulk bag top component of a size generally complementary to the storage space defined by said bulk bag bottom and top components, said liner having at least two spaced connector means for removably connecting said liner means within said bulk bag top component to said container.

7. A flexible bulk container which comprises in combination;
   (a) a flexible and collapsible bulk bag bottom component having a bottom end with an encircling first side wall connected at a lower portion thereof to the bottom end about its periphery and an opposite open end:
   (b) a flexible and collapsible bulk bag top component having a top end, an encircling second side wall connected at an upper portion thereof to said top end about its periphery and a skirt member secured at an upper portion thereof about the periphery of said top end spaced from and extending about at least a portion of said second encircling side wall, said bulk bag top component being separably receivable within said bulk bag bottom component with said second encircling side wall generally complementary to said first encircling side wall wherein said top and bottom ends and encircling first and second side walls define an interior storage space therebetween for flowable granular or powdered bulk material with the second side wall being adapted to be in firm engagement with said first side wall when said storage space is at least partially filled and said skirt member being adapted to extend about at least a portion of said first encircling side wall.

8. The invention according to claim 7 wherein said top and bottom components have inside surfaces in contact with said materials, said top component having a lower end opposite said top end, said lower end of said separately receivable top component and said opposite open end of said bottom component each having an opening substantially equal in size to the outermost perimeter of said bulk container, said components constructed such that upon disengagement of said components the openings in each allow for visual exposure of substantially entirely all inside surfaces of said components, access to said side walls and ends uninhibited by other side walls and ends.

9. The flexible bulk container as claimed in claim 7, wherein said bottom end has an opening therethrough through which contents are discharged.

10. The flexible bulk container as claimed in claim 7, wherein said top end has an opening therethrough through which the container is filled.

11. The flexible bulk container as claimed in claim 7, wherein said bag bottom component includes lifting means secured thereto and projecting upwardly therefrom which is adapted to be releasably interconnected with said bag upper component and project upwardly therefrom.

12. The flexible bulk container as claimed in claim 7, wherein said container includes a flexible and collapsible liner removably receivable within said bulk bag top component of a size generally complementary to the storage space defined by said bulk bag bottom and top components, said liner having connector means for removably connecting said liner within said bulk bag top component and within said container.

13. The flexible bulk container as claimed in claim 12, wherein said top end has an opening therethrough through which the container is filled and the liner means has an opening therethrough complementary to the opening in said top end.

* * * * *

UNITED STATES PATENT AND TRADEMARK OFFICE
CERTIFICATE OF CORRECTION

PATENT NO. : 5,192,134
DATED : March 9, 1993
INVENTOR(S) : Walter J. Polett

It is certified that error appears in the above-identified patent and that said Letters Patent is hereby corrected as shown below:

TITLE PAGE:
In the Abstract, line 15, "stoarage" should read --storage--

Column 8, line 67, "sida" should read --said--

Column 9, line 3, the second "and" should read --the--

Signed and Sealed this

Fourth Day of January, 1994

Attest:

BRUCE LEHMAN

Attesting Officer     Commissioner of Patents and Trademarks